Oct. 21, 1941.  H. B. FINK  2,260,016
EGG CLEANER
Filed Nov. 4, 1940  2 Sheets-Sheet 2

INVENTOR
Harold B. Fink
BY
Webster & Webster
ATTORNEYS

Patented Oct. 21, 1941

2,260,016

UNITED STATES PATENT OFFICE 2,260,016

EGG CLEANER

Harold B. Fink, Woodlake, Calif.

Application November 4, 1940, Serial No. 364,205

14 Claims. (Cl. 51—187)

This invention relates in general to a device adapted for use in connection with the preparation of eggs for market, and in particular the invention is directed to an egg cleaner.

Trade requirements now demand that eggs be well cleaned before being offered for sale, and to this end certain types of power driven egg cleaners have heretofore been developed. However, such egg cleaners, in addition to a relatively high cost of acquisition, have not been entirely successful in operation, and have not been generally substituted for hand cleaning.

It is therefore the principal object of my invention to provide a unique, power driven egg cleaner which is operative to clean eggs effectively and with facility.

Another object of the invention is to provide a power driven egg cleaner wherein the cleaning assembly is self-conforming to the egg which is engaged therewith.

It is also an object of the invention to provide a power driven egg cleaner in which the cleaning assembly includes removable and readily replaceable abrasive elements.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
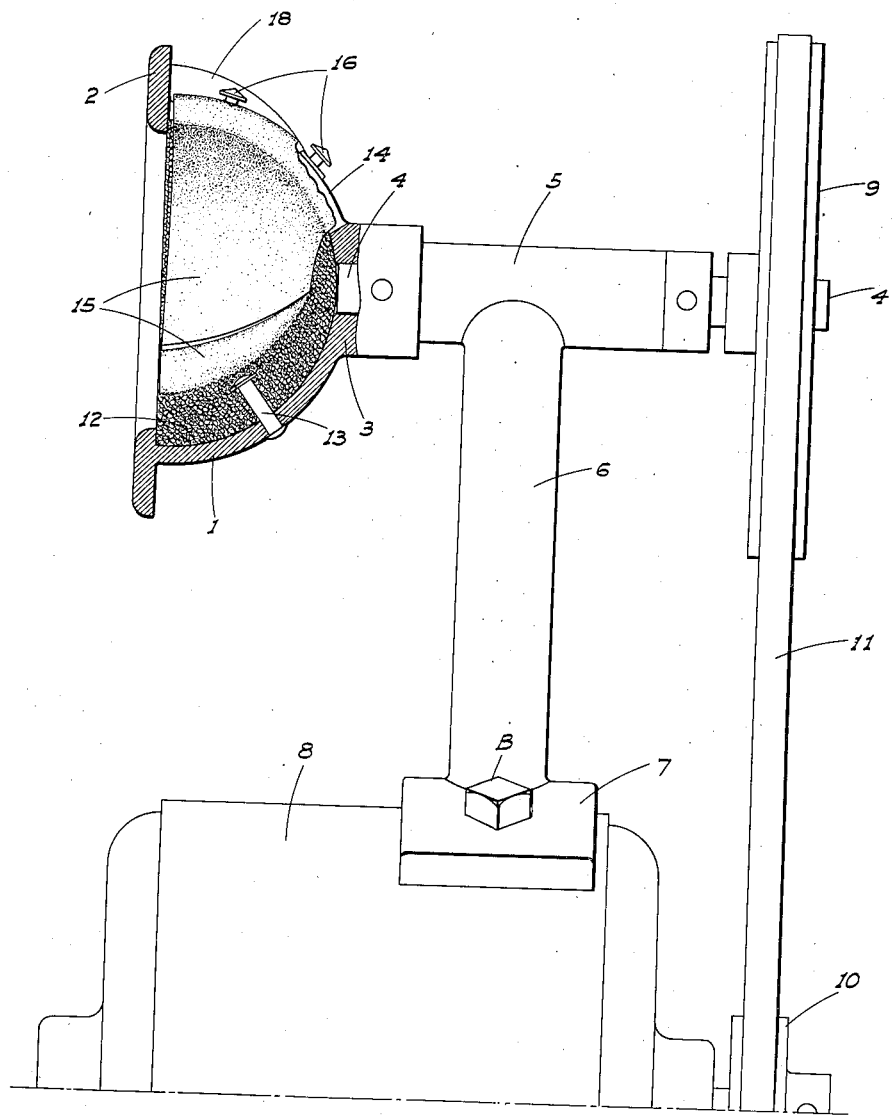
Figure 1 is a side elevation of the device with the rotatable head and cleaning assembly in section.
Figure 2:
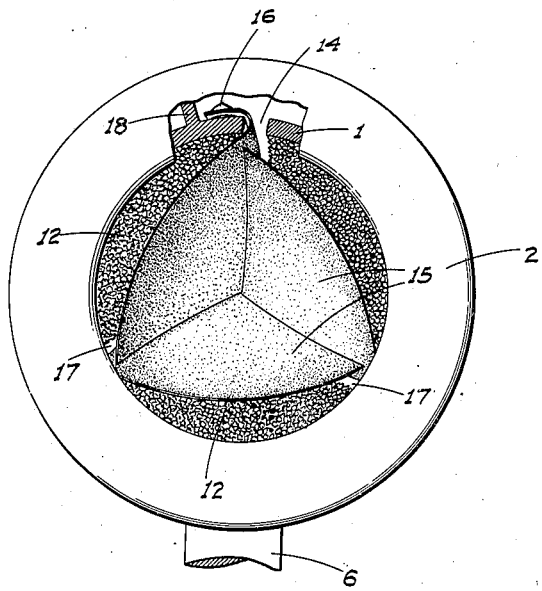
Figure 2 is a front elevation of the rotatable head and cleaning assembly.
Figure 3:
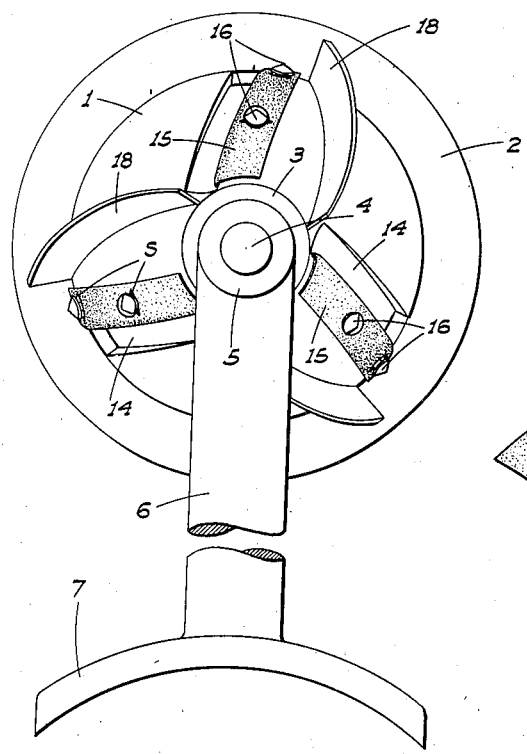
Figure 3 is a rear end view of the device.

Referring now more particularly to the characters of reference on the drawings, the device comprises a semi-spherical cup-shaped head or shell 1 of rigid material, preferably metal; such head being disposed with its axis horizontal. A protector flange 2 is formed integral with head 1 and projects radially out from the periphery of said head. At its closed end the head includes a hub 3 which is mounted on one end of a horizontal shaft 4 journaled in a horizontal supporting sleeve 5.

Intermediate its ends, sleeve 5 is supported by a vertical and rigid post 6 formed with a saddle 7 at its lower end. This saddle rests atop the case or housing of an electric motor 8 and is secured thereto by suitable means, such as bolts B. The post 6 is of such height that head 1 is disposed in spaced relation to and some distance above the motor 8.

At the end opposite head 1, shaft 4 projects from sleeve 5 and is fitted with a pulley 9 which is driven from the motor pulley 10 by an endless drive belt 11.

The egg cleaning assembly is mounted in head 1 and comprises the following:

The inner face of head 1 is lined with a relatively thick layer of sponge rubber 12, preferably in segments, secured to the head by means such as rivets 13; such sponge rubber being of a thickness and configuration to define, within the head, a pyramidal area whose base is open to the open end of said head. The inner or working faces of the sponge rubber which form the sides of such pyramidal area are concave as shown, and the minimum width of said area at its outer open end or base is somewhat less than the diameter of the eggs to be cleaned, and said area is of lesser depth than the length of an egg.

Figure 4:
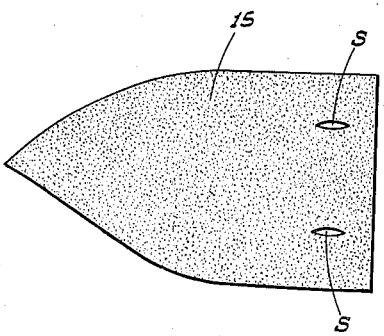
Figure 4 is a plan view of one of the flexible abrasive sheets, detached.

The head 1 is formed with circumferentially spaced slots 14 which extend from flange 2 to hub 4 in substantially the line of the side edges of the pyramidal area. Abrasive sheets 15 of sand paper or sand cloth are cut to substantially the configuration shown in Fig. 4, and at their square end each is provided with slits S for impalement on headed pins 16, longitudinally spaced pair of which are mounted on the head exteriorly thereof and adjacent each slot. From these pins 16 the sheets 15 pass into head 1 through the slots 14 and lining of sponge rubber; the latter being slotted as at 17, or the segments thereof so spaced apart, to correspond with said slots 14. The portions of sheets 15 within the pyramidal area in the bead fold in the direction of rotation of the head against the concave working surfaces of the sponge rubber forming the sides of said area and lie thereagainst in conforming relation, with the abrasive surface outward. The free end of each sheet overlaps the next sheet slightly, so as to form a continuous abrasive surface or pocket within the head.

Fan blades 18 are mounted on the back of head 1 and are shaped and disposed to cause a rearward suction.

In use, operation of motor 8 causes rotation of head 1, as is obvious. With the head rotating, a person grasps an egg and projects one half thereof into the abrasive pocket, which pocket, due to the sponge rubber, deforms or yields as necessary to permit entry of the egg and frictional engagement therewith. Thereupon the abrasive surface of such pocket effectively and rapidly cleans the engaged portion of the egg; any resulting dust being carried away from the operator through slots 14 by the suction caused by fan blades 18. When one portion of an egg has been cleaned, it is turned around and the other portion cleaned in like manner.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In an egg cleaner, a driven, cup-shaped head adapted to receive an egg lengthwise therein, a flexible abrasive sheet fitted into the cup for engagement with the egg, and a cushion lining between said sheet and the cup.

2. In an egg cleaner, a driven, cup-shaped head adapted to receive an egg lengthwise therein, a flexible abrasive sheet fitted into the cup for engagement with the egg, and a cushion lining between said sheet and the cup; said cushion lining being sponge rubber.

3. In an egg cleaner, a driven, cup-shaped head, a cushion lining in the cup, said lining forming a pyramidal pocket whose open end opens from the cup, and abrasive material applied to the inner or working face of said lining.

4. A device as in claim 3 in which the portions of said cushion lining forming the sides of the pyramidal pocket are concave.

5. In an egg cleaner, a driven, cup-shaped head, a cushion lining in said head, the head and lining having a slot therethrough lengthwise of the axis thereof, an abrasive sheet, and means connecting said sheet at one end on the exterior of the head, said sheet passing through said slot and thence conforming to and engaging said lining.

6. A device as in claim 5 in which said means comprises spaced, headed pins along the portion of the head adjacent said slot; the sheet being impaled on said heads.

7. In an egg cleaner, a driven, cup-shaped head, a cushion lining in said head, the head and lining being formed with circumferentially spaced slots therethrough lengthwise of the axis thereof, a plurality of abrasive sheets, and means connecting said sheets at one end on the exterior of the head, said sheets each passing through one of said slots and thence conforming to and engaging the inner or working surface of said lining.

8. A device as in claim 7 in which the portion of the sheets within the cup all extend circumferentially thereof in the same direction; said sheets overlapping each other somewhat and being of a width to extend substantially from end to end of the cup.

9. A device as in claim 7, in which the portion of said sheets within the cup all extend circumferentially and in the direction of rotation thereof.

10. A device as in claim 7 in which said cushion lining forms a pyramidal pocket; the slots being formed substantially along the side edges of said pocket, and the portion of each sheet in the cup overlying substantially only one side of said pocket.

11. An egg cleaner comprising a vertical support formed at its lower end with a saddle, a horizontal shaft, means journaling said shaft in connection with the upper end of said support, a cup-shaped head mounted axially on one end of said shaft and opening away therefrom, egg cleaning means in said cup, an electric motor including a drive shaft and pulley thereon, said saddle engaging the motor housing and being secured thereon, said first named shaft being parallel to the motor shaft, and a pulley on the other end of said first named shaft, and an endless drive belt between said pulleys.

12. An egg cleaner including a driven, cup-shaped head, egg cleaning means in the cup, and a radial flange projecting outwardly from the periphery of said cup.

13. An egg cleaner including a driven, cup-shaped head, egg cleaning means in the cup; the cup having openings therethrough, and fan blades mounted on the exterior of the cup.

14. A device as in claim 13 including a radial flange projecting outwardly from the periphery of said cup, said flange projecting to a point outwardly of said fan blades.

HAROLD B. FINK.